(12) United States Patent
Park et al.

(10) Patent No.: US 7,869,501 B2
(45) Date of Patent: Jan. 11, 2011

(54) METHOD FOR DECODING A VIDEO SIGNAL TO MARK A PICTURE AS A REFERENCE PICTURE

(75) Inventors: Seung Wook Park, Seoul (KR); Byeong Moon Jeon, Seoul (KR); Soung Hyun Um, Anyang-si (KR); Ji Ho Park, Seoul (KR); Dong Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 191 days.

(21) Appl. No.: 11/992,958

(22) PCT Filed: Oct. 2, 2006

(86) PCT No.: PCT/KR2006/003979
§ 371 (c)(1),
(2), (4) Date: Apr. 2, 2008

(87) PCT Pub. No.: WO2007/040336
PCT Pub. Date: Apr. 12, 2007

(65) Prior Publication Data
US 2009/0225866 A1    Sep. 10, 2009

(30) Foreign Application Priority Data
Sep. 29, 2006   (KR) .................. 10-2006-0095950

(51) Int. Cl.
*H04N 7/48* (2006.01)
(52) U.S. Cl. .................. 375/240.01; 375/240.24
(58) Field of Classification Search ............ 375/240.12, 375/240.13, 240.1, 240.11, 240.24, 240.26, 375/240.01
See application file for complete search history.

(56) References Cited

U.S. PATENT DOCUMENTS

| 6,339,618 | B1 | 1/2002 | Puri et al. |
| 6,510,177 | B1 | 1/2003 | De Bonet et al. |
| 6,614,936 | B1 | 9/2003 | Wu et al. |
| 6,907,070 | B2 | 6/2005 | Wu et al. |

(Continued)

FOREIGN PATENT DOCUMENTS

KR   10-2000-0070003   11/2000

(Continued)

OTHER PUBLICATIONS

Office Action for corresponding Australian Application dated Jun. 1, 2009.

(Continued)

*Primary Examiner*—David E Harvey
(74) *Attorney, Agent, or Firm*—Harness, Dickey & Pierce, P.L.C.

(57) ABSTRACT

A method for efficiently decoding a video signal is disclosed. The method for decoding a video signal based on fine granularity scalability (FGS) includes acquiring picture identification information indicating a reference picture of a current block, and decoding the current block using the reference picture. A base layer reference picture and an enhanced layer reference picture corresponding thereto have the same picture identification information. Accordingly, it is possible to minimize a problem caused in a procedure for decoding a video signal due to transmission error.

4 Claims, 7 Drawing Sheets

U.S. PATENT DOCUMENTS

| | | | |
|---|---|---|---|
| 6,940,905 | B2 | 9/2005 | Van Der Schaar et al. |
| 7,561,783 | B2* | 7/2009 | Comer et al. ............... 386/125 |
| 2002/0118742 | A1 | 8/2002 | Puri et al. |
| 2002/0118743 | A1 | 8/2002 | Jiang |
| 2002/0126759 | A1* | 9/2002 | Peng et al. ............. 375/240.16 |
| 2003/0007557 | A1 | 1/2003 | Katata et al. |
| 2003/0223493 | A1 | 12/2003 | Ye et al. |
| 2003/0223643 | A1 | 12/2003 | Van Der Schaar |
| 2004/0001635 | A1 | 1/2004 | Van Der Schaar |
| 2004/0252900 | A1 | 12/2004 | Bruls |
| 2005/0011543 | A1 | 1/2005 | Haught et al. |
| 2005/0111543 | A1* | 5/2005 | Seo ........................ 375/240.2 |
| 2006/0198440 | A1* | 9/2006 | Yin et al. ............... 375/240.12 |
| 2006/0233241 | A1* | 10/2006 | Ridge et al. ............ 375/240.08 |
| 2006/0233242 | A1* | 10/2006 | Wang et al. ............ 375/240.08 |
| 2006/0251169 | A1* | 11/2006 | Wang .................... 375/240.12 |
| 2006/0282737 | A1* | 12/2006 | Shi et al. .................... 714/746 |
| 2007/0033494 | A1* | 2/2007 | Wenger et al. .............. 714/776 |
| 2007/0047644 | A1* | 3/2007 | Lee et al. ................. 375/240.1 |
| 2007/0074266 | A1* | 3/2007 | Raveendran et al. ........ 725/135 |
| 2007/0291836 | A1* | 12/2007 | Shi et al. ............... 375/240.01 |

FOREIGN PATENT DOCUMENTS

| | | |
|---|---|---|
| KR | 10-2002-0090239 | 11/2002 |
| KR | 10-2003-0078772 | 10/2003 |
| KR | 2003/0086100 | 11/2003 |
| KR | 10-2006-0034192 | 4/2006 |
| KR | 10-2006-0043115 | 5/2006 |
| KR | 10-2006-0063533 | 6/2006 |
| WO | WO 01/39503 | 5/2001 |
| WO | WO 01/39503 A1 | 5/2001 |
| WO | WO 01/49036 A1 | 7/2001 |
| WO | WO 03/017672 | 2/2003 |
| WO | WO 03/075578 A2 | 9/2003 |
| WO | WO 2004/030368 A1 | 4/2004 |
| WO | WO 2005/032138 A1 | 4/2005 |
| WO | WO 2006/132509 | 12/2006 |
| WO | 2007/040336 | 4/2007 |
| WO | WO 2007/040370 A1 | 4/2007 |

OTHER PUBLICATIONS

"The MPEG-4 Fine-Grained Scalable Video Coding Method for Multimedia Streaming over IP" IEEE Transactions on Multimedia, vol. 3 No. 1, Mar. 2001.

International Search Report dated Jan. 18, 2007.
International Search Report dated Jan. 22, 2007.
International Search Report dated Jan. 24, 2007.
International Search Report dated Jan. 29, 2007.
International Search Report dated Jun. 14, 2007.

Mihaela Van Der Schaar and Hayder Radha, "Adaptive motion-compensation fine-granular-scalability (AMC-FGS) for wireless video", IEEE Transactions on Circuits and Systems for Video Technology, vol. 12, No. 6, pp. 360-371, Jun. 2002.

J.R. Ohm, "Advances in scalable video coding", Proc. Of the IEEE, vol. 93, No. 1, pp. 42-56, Jan. 2005.

H. Kimata et al. *Hierarchical Reference Picture Selection Method for Temporal Scalability Beyond H.264*, IEEE Int'l Conf. Multimedia and Expo, vol. 1, pp. 181-184, Jun. 27-30, 2004.

T. Yang et al. *An Adaptive Key-Frame Reference Picture Selection Algorithm for Video Transmission Via Error Prone Networks*, Autonomous Decentralized Systems, pp. 367-371, Apr. 4-8, 2005.

International Search Report (PCT/ISA/210), Dated Jan. 2007.

Written Opinion (PCT/ISA/237, Dated Jan. 2007.

Office Action for corresponding Russian Application No. 2008-117444, dated Jan. 26, 2009.

Joint Video Team (JVT) of ISO/IEC MPEG & ITU-T VCEG, JVT-0054, Improvements to Fine Granularity Scalability for Low-Delay Applications, 15th Meetings, Busan, Korea, Apr. 2005, pp. 1-8.

Richardson, H.264 and MPEG-4 for Next-generation standard, Tehnosfera, Moscow, 2005, the Russian translation of the publication 2003, pp. 186-205.

Richardson, H.264 and MPEG-4 Video Compression: Video coding for Next-generation Multimedia, Iain Richardson, 306 pages, Oct. 2003, in English Language.

European Search Report dated Jan. 28, 2010 for Application No. 06799109.1.

Woo-Jin Han, "Smoothed reference prediction for single-loop decoding", JVT of ISO/IEC MPEG & ITU-T VCEG, Poznan, Poland, Jul. 2005.

Reichel, J. "Joint Scalable Video Model JSVM-2"- JVT of ISO/IEC MPEG & ITU-T VCEG, Busan, Korea, Apr. 2005.

Bao et al. "A Low-complexity AVC/based Scalable Video Codec" — ISO/IEC JTC1/SC29/WG11, Hong Kong, Jan. 2005 .

* cited by examiner

| MMCO code number | Operation Contents |
|---|---|
| 0 | End |
| 1 | Remove a short-term picture from a buffer |
| 2 | Remove a long-term picture from a buffer |
| 3 | Move a short-term picture to a long-term memory |
| 4 | Decide a size of a long-term memory |
| 5 | Reset all contents of a multiple picture buffer |
| 6 | Store a current picture in a long-term memory |

FIG. 8

MåETHOD FOR DECODING A VIDEO SIGNAL
TO MARK A PICTURE AS A REFERENCE
PICTURE

TECHNICAL FIELD

The present invention relates to a method for decoding a video signal.

BACKGROUND ART

A communication environment is currently being changed together with the development of a Broadband convergence Network (BcN) for allowing a service such as a wired and wireless complex network, a combination of a broadcasting network and a communication network, or IP convergence using an Internet protocol (IP) network. Such a tendency for change of the communication environment will be accelerated in future. Due to the change of the communication environment, terminals used in a variety of communication environments are being diversely changed and processing capabilities of the terminals are also being changed. Accordingly, in order to provide video signals optimized for various communication environments and various terminals, a variety of video signals provided to the terminals must be created. In order to provide the optimized video signals to the terminals, one video source must include a variety of combinations of variables such as the number of transmission frames per second, resolution and the number of bits per pixel, etc. This imposes a great burden on content providers.

In view of the above, the content providers encode an original video signal into high-bitrate compressed video data, decode the compressed video data into the original video signal when a request for the video is received from a terminal, and encode the original data into video data suitable to a video processing capability of the terminal before providing the video data to the terminal. However, in such transcoding (a combination of decoding and encoding), processes of encoding, decoding and encoding must be performed and thus a time delay occurs when providing the video signal to the terminal. Therefore, a device having complex hardware and algorithms is further required.

In order to solve such a problem, a scalable video coding (SVC) has been suggested. This method can represent video signals by encoding the video signals into a sequence of pictures with highest image quality and decoding only a part (a partial sequence of pictures intermittently selected from total sequence of frames) of the sequence of pictures. The sequence of pictures encoded using the SVC can reduce a video size using spatial scalability or reduce image quality using SNR scalability with a low bitrate. At this time, a sequence of pictures having a small screen size and/or a small number of frames per second is referred to as a base layer and a sequence of pictures having a large screen size and/or a large number of frames per second is referred to as an enhanced or enhancement layer.

Although it is possible to represent video signals in low image quality by receiving and processing a part of the sequence of pictures encoded in the scalable method as described above, the image quality is significantly degraded as the bitrate is lowered. One solution to this problem is to provide an auxiliary picture sequence having low bitrates, for example, a sequence of pictures that have a small screen size and/or a small number of frames per second. The auxiliary picture sequence is referred to as a base layer, and a main picture sequence is referred to as an enhanced (or enhancement) layer.

In this SVC, if a part of enhanced layer bitstream is lost when decoding a specific picture including the enhanced layer, which is encoded and transmitted, a decoder decodes the picture using the lost enhanced layer bitstream. Accordingly, the image qualities of the original video signals and the decoded video signals are different from each other. Specifically, when the picture having the above-mentioned problem is a reference picture necessary for decoding the other pictures as well as a key picture, the problem becomes more severe.

DISCLOSURE OF INVENTION

Accordingly, the present invention is directed to a method for decoding a video signal that substantially obviates one or more problems due to limitations and disadvantages of the related art.

An object of the present invention devised to solve the problem lies on a decoding method which is capable of minimizing a problem caused in a procedure for decoding a video signal due to transmission error.

Another object of the present invention devised to solve the problem lies on a method for managing a decoded picture buffer according to a decoding method which is capable of minimizing a problem caused in a procedure for decoding a video signal due to transmission error.

The object of the present invention can be achieved by providing a method for decoding a video signal based on fine granularity scalability (FGS) comprising: obtaining picture identification information indicating a reference picture of a current block; and decoding the current block using the reference picture, wherein a base layer reference picture and an enhanced layer reference picture corresponding thereto have same picture identification information.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Figure 1:
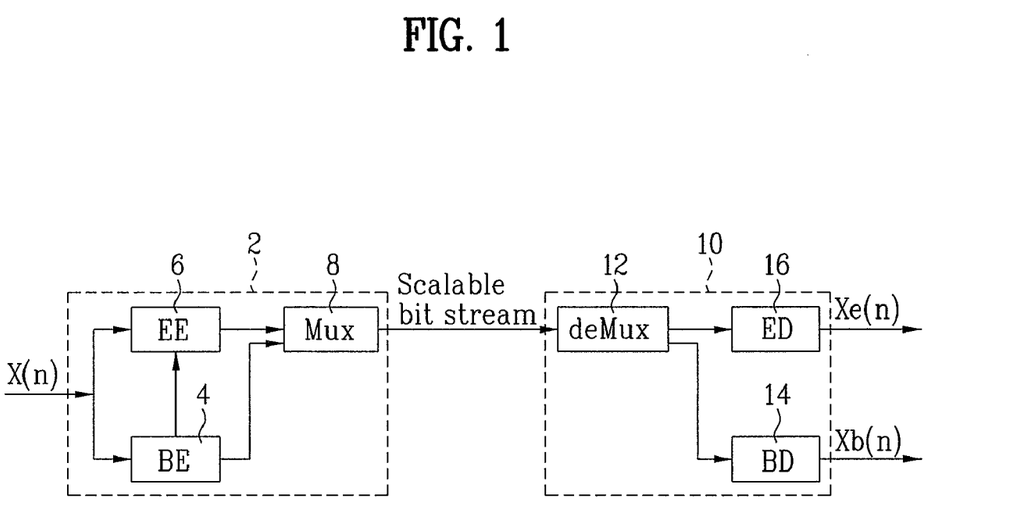
FIG. 1 is a schematic block diagram of a scalable video coding system to which the present invention applies.

FIG. 1 is a schematic block diagram of a scalable video coding system to which the present invention applies.

The scalable video coding system includes an encoder 2 and a decoder 10. The encoder 2 includes a base layer encoder 4, an enhanced layer encoder 6 and a mux 8. The decoder 10 includes a demux 12, a base layer decoder 14 and an enhanced layer decoder 16. The base layer encoder 4 compresses an input video signal X(n) and generates a base layer bitstream. The enhanced layer encoder 6 generates an enhanced layer bitstream using the input video signal X(n) and information generated by the base layer encoder 4 and the mux 8 generates a scalable bitstream using the base layer bitstream and the enhanced layer bitstream. The generated scalable bitstream is transmitted to the decoder 10 via a certain channel and the transmitted scalable bitstream is divided into the enhanced layer bitstream and the base layer bitstream by the demux 12 of the decoder 10. The base layer decoder 14 receives the base layer bitstream and decodes the base layer bitstream into an output video signal Xb(n), and the enhanced layer decoder 16 receives the enhanced layer bitstream and decodes the enhanced layer bitstream into an output video signal Xe(n). The output video signal Xb(n) has lower resolution and image quality than the output video signal Xe(n).

Figure 2:
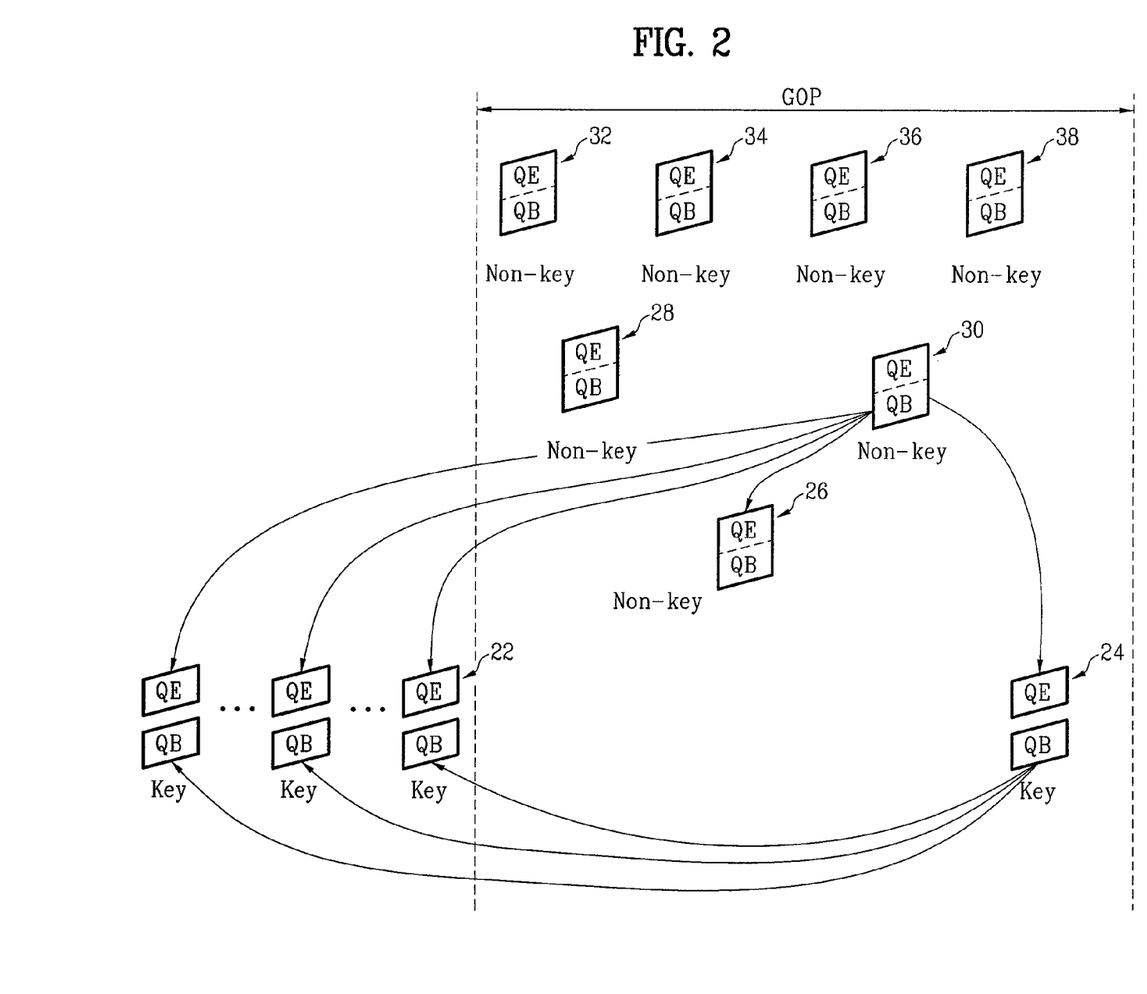
FIG. 2 is a view showing a structure of pictures used in a decoding method and a method for managing a decoded picture buffer according to an embodiment of the present invention.

FIG. 2 is a view showing a structure of pictures used in a decoding method and a method for managing a decoded picture buffer according to an embodiment of the present invention.

In the structure of pictures, a Group of Picture (GOP) is formed of a hierarchical B picture structure, and pictures which configure the GOP are classified into key picture and non-key picture. One picture consists of a base layer reference picture QB and an enhanced layer reference picture QE. The key picture represents a picture having a lowest temporal level and the non-key picture represents pictures except the key picture.

In this structure, a current picture may use at least one picture from the pictures having temporal levels lower than or equal to that of the current picture as a reference picture. For example, when a first picture 22 is an I picture encoded by an intra prediction, the first picture 22 is decoded without a reference picture, a second picture 24 is decoded using the first picture 22 as the reference picture, a third picture 26 is decoded using the first and second pictures 22 and 24 as the reference pictures, fourth pictures 28 and 30 are decoded using the first and third pictures 22 and 26 or the second and fourth pictures 24 and 26 as the reference pictures, fifth pictures 32, 34, 36 and 38 are decoded using the first and fourth pictures 22 and 28, the third and fourth pictures 26 and 28 or the second and fourth pictures 24 and 30 as the reference pictures. The pictures are decoded in order of the first picture 22, the second picture 24, the third picture 26, the fourth pictures 28 and 30, and the fifth pictures 32, 34, 36 and 38. The first and second pictures 22 and 24 are the key pictures and the third to fifth pictures 26, 28, 30, 32, 34, 36 and 38 are the non-key pictures. The key picture includes the base layer reference picture and the enhanced layer reference picture and is represented as the first picture 22 and the second picture 24 in FIG. 2. When the non-key picture is used as the reference picture, the enhanced layer reference picture of the non-key picture is referred. The enhanced layer reference picture of the non-key picture indicates that the base layer reference picture of the non-key picture is already reconstructed, and is represented by a dotted line, as the third to fifth pictures 26, 28, 30, 32, 34, 36 and 38 shown in FIG. 2.

Figure 3:
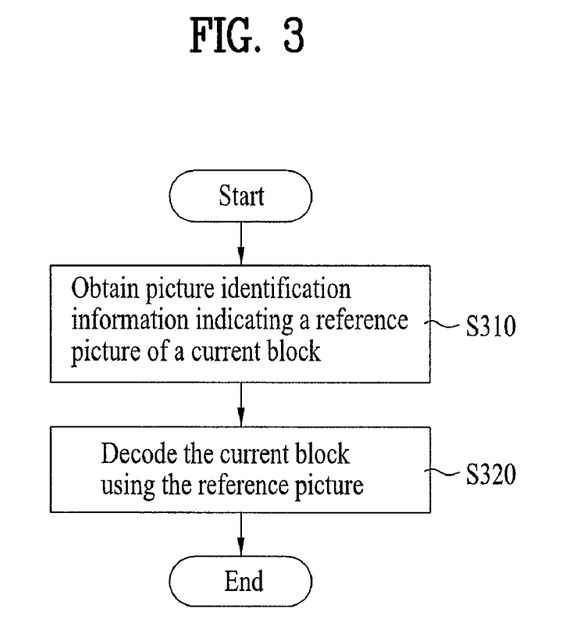
FIG. 3 is a flowchart illustrating a method for decoding a video signal according to an embodiment of the present invention.

FIG. 3 is a flowchart illustrating a method for decoding a video signal according to an embodiment of the present invention.

First, the decoder receives the encoded video signal via a certain channel. Picture identification information indicating a reference picture of a current block is acquired from the video signal (S310). The picture identification information may be, for example, reference index information or picture number information of the reference picture. The current block may be decoded using the reference picture (S320). The base layer reference picture and the enhanced layer reference picture corresponding thereto may have the same picture identification information. The picture identification information may be the reference index information or the picture number information of the reference picture. The enhanced layer reference picture may have an image quality higher than that of the base layer reference picture.

When the picture including the current block is the key picture, the reference picture of the current block may be the base layer reference picture or the enhanced layer reference picture corresponding thereto. The reference picture of the current block may be obtained from a reference picture list based on the picture identification information. The current block can be decoded using the obtained reference picture. Even in this case, the base layer reference picture and the enhanced layer reference picture corresponding thereto may have the same picture identification information. The enhanced layer reference picture may have an image quality higher than that of the base layer reference picture.

For example, when the current picture shown in FIG. 2 is the second picture 24 as well as a P picture, the reference picture of the second picture 24 is the first picture 22 and the second picture 24 is the key picture. Accordingly, the second picture 24 which is the current picture can be decoded by referring to the base layer reference picture or the enhanced layer reference picture of the first picture 22. At this time, the base layer reference picture and the enhanced layer reference picture may have the same picture identification information and the picture identification information may be the reference index information or the picture number information of the reference picture. As another example, when the current picture is the fourth picture 28, the reference picture of the fourth picture 28 is the first and third pictures 22 and 26 and the fourth picture 28 corresponds to the non-key picture. In this case, the reference picture of the fourth picture 28 which is the current picture includes the base layer reference picture of the first picture 22, the enhanced layer reference picture of the first picture 22 or the enhanced layer reference picture of the third picture 26. The enhanced layer reference picture of the third picture 26 indicates that the base layer reference picture of the third picture is already reconstructed.

Figure 4:
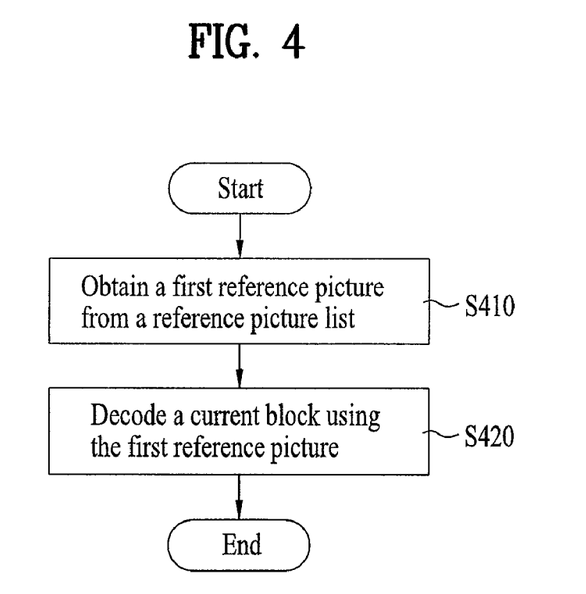
FIG. 4 is a flowchart illustrating a method for decoding a video signal according to another embodiment of the present invention.

FIG. 4 is a flowchart illustrating a method for decoding a video signal according to another embodiment of the present invention.

First, a first reference picture can be obtained from a reference picture list (S410). Here, the first reference picture is associated with the picture identification information and the picture identification information includes the reference index information or the picture number information of the reference picture. For example, the first reference picture in the reference picture list can be obtained using the reference index information. A current block can be decoded using the obtained first reference picture (S420). At this time, the first reference picture and a second reference picture corresponding thereto may have the same picture identification information and the first reference picture and the second reference picture are distinguished from each other by another identification information. For example, the base layer reference picture 40 and the enhanced layer reference picture 42 having the same picture number may be distinguished from each other by marking the base layer reference picture 40 with "base representation" in a decoded reference picture marking process. The first reference picture may belong to the base layer and the second reference picture may belong to the enhanced layer. The enhanced layer may have image quality higher than that of the base layer. When the picture including the current block is the key block, the reference picture of the current block may be the first reference picture or the second reference picture corresponding thereto. The current block can be decoded using the obtained reference picture.

As shown in FIGS. 3 and 4, when the reference picture is the first picture 22 or the second picture 24, which is the key picture, it is possible to provide the base layer reference picture or the enhanced layer reference picture to the current picture. Alternatively, it is possible to provide the first reference picture or the second reference picture to the current picture. Accordingly, the reference picture must be stored in the decoded picture buffer. According to the method for decoding the video signal of the present invention, a method for allocating a reference number to the reference picture in the decoded picture buffer or a method for managing the decoded picture buffer such as a method for deleting the reference picture needs to be newly defined. The method for managing the decoded picture buffer according to an embodiment of the present invention will be described in detail with reference to FIGS. 5 and 6.

First, in an embodiment of the present invention, when the reference picture is the key picture, the same picture identification number may be allocated to the base layer reference picture and the enhanced layer reference picture of the reference picture stored in the decoded picture buffer. When the reference picture is the non-key picture, since the enhanced layer reference picture of the reference picture is stored in the decoded picture buffer, one picture identification number is allocated to the enhanced layer reference picture of the reference picture. That is, when the reference picture is the key picture, the base layer reference picture and the enhanced layer reference picture of the reference picture may be treated as a virtual picture. Here, the allocated picture identification information includes the picture number information or the reference index information and the picture number information includes a long-term reference picture number.

Figure 5:
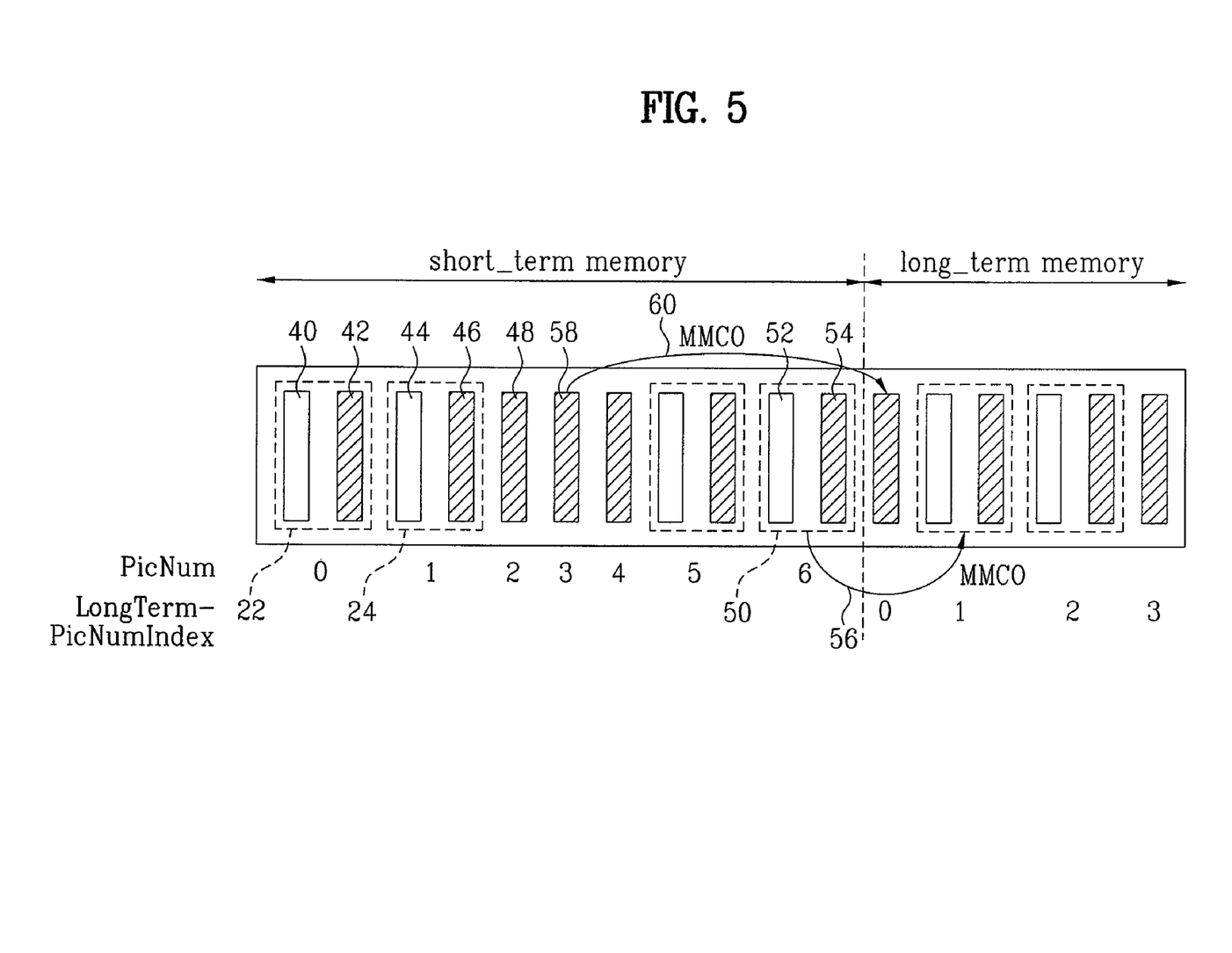
FIG. 5 is a view illustrating a structure of a decoded picture buffer according to an embodiment of the present invention.

FIG. 5 is a view illustrating a structure of a decoded picture buffer according to an embodiment of the present invention.

When the first picture 22 which is the key picture as well as the reference picture as shown in FIG. 2 is decoded and stored in the decoded picture buffer, the base layer reference picture 40 and the enhanced layer reference picture 42 which configure the first picture 22 are stored with a picture number "0". In the second picture 24 which is the key picture as well as the reference picture similar to the first picture 22, the base layer reference picture 44 and the enhanced layer reference picture 46 which configure the second picture 24 are stored with a picture number "1". In the third picture 26 which is the non-key picture as well as the reference picture, the enhanced layer reference picture 48 of the reference picture 26 is stored with a picture number "2". The fifth pictures 32, 34, 36 and 38 are not stored in the decoded picture buffer except for a case where the picture is not displayed immediately after decoding, because the fifth pictures are non-reference pictures.

At this time, when the current picture is the key picture and refers to the reference picture having the picture number "0", since the base layer reference picture 40 and the enhanced layer reference picture 42 of the reference picture 22 have the same picture identification information of the picture number "0", the base layer reference picture 40 and the enhanced layer reference picture 42 having the picture number "0" must be distinguished from each other. Accordingly, the present invention may use another identification information. For example, the base layer reference picture 40 and the enhanced layer reference picture 42 having the same picture number are distinguished from each other by marking the base layer reference picture 40 with the "base representation" in the decoded reference picture marking process.

As another embodiment of the present invention, the picture identification information of the pictures stored in the decoded picture buffer varies depending on which picture is decoded in the decoded picture buffer. Therefore, the first reference picture in the reference picture list may be obtained from the reference picture list and the current block may be decoded using the first reference picture. At this time, the first reference picture and the second reference picture corresponding thereto have the same picture identification information and the first reference picture and the second reference picture may be distinguished from each other by another identification information. For example, the first reference picture and the second reference picture having the same picture number may be distinguished from each other by marking the first reference picture or the second reference picture with the "base representation" in the decoded reference picture marking process. The first reference picture may belong to the base layer and the second reference picture may belong to the enhanced layer. In this case, the first reference picture and the second reference picture may be distinguished from each other by marking the first reference picture with the "base representation".

As another embodiment of the present invention, the reference picture list may be initialized using the reference picture when decoding the current block using the reference picture, as described with reference to FIGS. 3 and 4. The initialized reference picture list may be reordered. When the reference picture list is reordered, the reference picture can be obtained from the reordered reference picture list. The reordering of the reference picture list will be described with reference to FIGS. 6a and 6b.

Figure 6A:
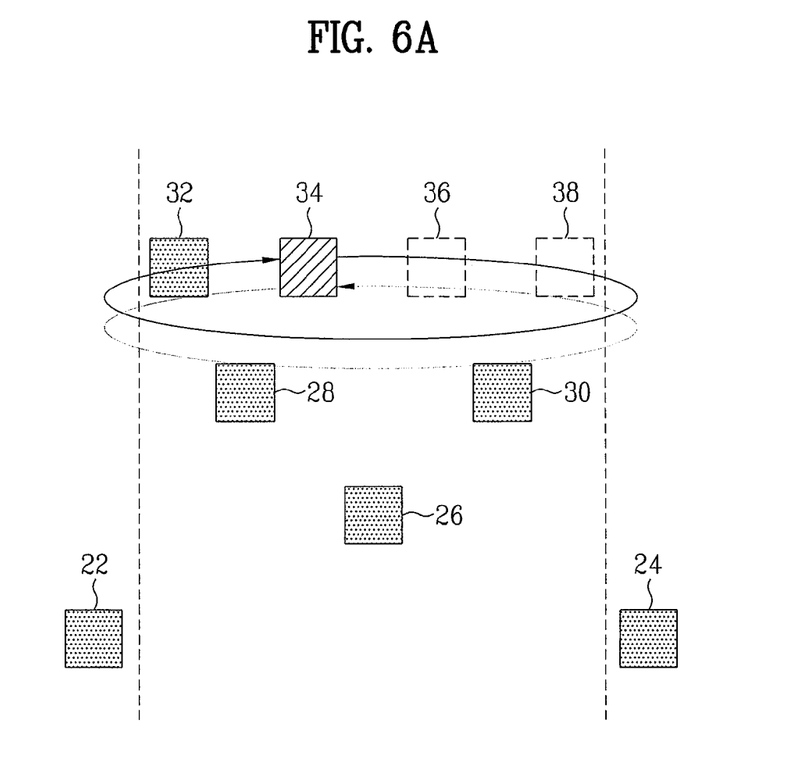
FIGS. 6a to 6b are views illustrating reordering of reference numbers of a reference picture according to an embodiment of the present invention.
Figure 6B:
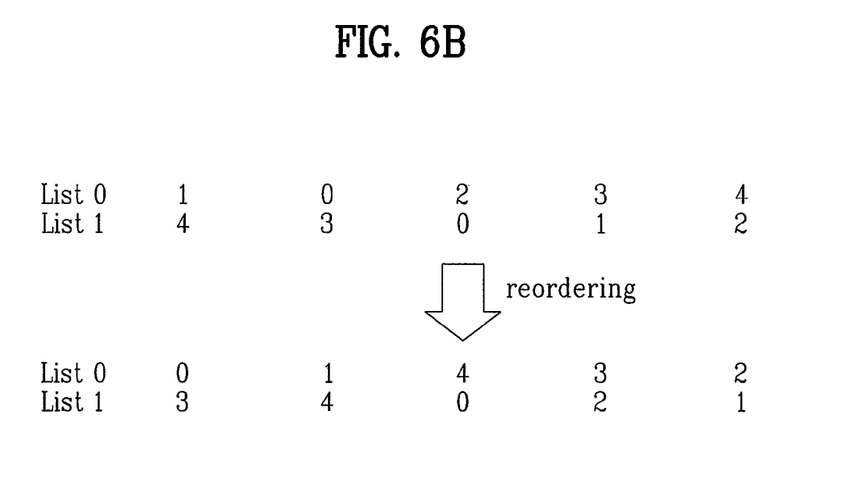

FIGS. 6a to 6b are views showing reordering of reference numbers of a reference picture according to an embodiment of the present invention.

The reordering of the reference numbers represents a command for reallocating a lowest reference number to a picture having highest correlation with the current picture in the reference picture list and efficiently managing the reference picture when pictures, which are temporally close to the current picture, have lower correlation with the current picture than that of a picture, which is temporally far from the current picture, when decoding the current picture. The reordering of the reference numbers will be described in detail with reference to FIGS. 6a and 6b.

FIG. 6a shows the structure of the pictures in a state where the first, second, third and fourth pictures 22, 24, 26, 28 and 30 are decoded and stored in the decoded picture buffer. When the fifth picture 34 is desired to be decoded, the reference picture list 0 of the pictures stored in the decoded picture buffer is configured as shown in FIG. 6b. The reference numbers are given to the pictures while rotating the reference picture list 0 from the fifth picture 34 in a counterclockwise direction and the reference numbers are given to the pictures while rotating the reference picture list 1 from the fifth picture 34 in a clockwise direction. However, when the first picture 22, which is temporally far from the fifth picture 34, has higher correlation with the fifth picture 34 than that of the fourth picture 28, which is temporally close to the fifth picture 34, in the reference picture list 0, the reference number 0 is reallocated to the first picture 22 and the reference number 1 is reallocated to the fourth picture 28, thereby reordering the reference picture list. When the second picture 24, which is temporally far from the fifth picture 34, has higher correlation with the fifth picture 34 than that of the fourth picture 30, which is temporally close to the fifth picture 34, in the reference picture list 1, the reference number 1 is reallocated to the second picture 24 and the reference number 2 is reallocated to the fourth picture 30, thereby reordering the reference picture list.

In an embodiment of the present invention, as described above, in the reordering of the reference numbers, when the reference picture is the key picture, the base layer reference picture and the enhanced layer reference picture are treated as one picture, to which the reference number is reallocated, and, when the reference picture is the non-key picture, the reference number allocated to the enhanced layer reference picture is reallocated, thereby reordering the reference picture list.

As another embodiment of the present invention, the initialization of the reference picture list uses the same method as that of the reordering of the reference numbers. For example, the picture identification information indicating the reference picture of the current block is obtained and the reference picture stored in the reference picture buffer is read based on the obtained picture identification information. The current block is decoded using the read reference picture. The base layer reference picture and the enhanced layer reference picture corresponding thereto may have the same picture identification information and the picture identification information includes the reference index information or the picture number information of the reference picture. When the reference picture is the key picture, the base layer reference picture and the enhanced layer reference picture of the reference picture are treated as one picture, to which the reference number may be allocated. When the reference picture is a non-key picture, the reference number may be allocated to the enhanced layer reference picture. Even when the reference picture needs to be no longer referred and is deleted from the decoded picture buffer using a sliding window method, if the reference picture is the key picture, the base layer reference picture and the enhanced layer reference picture of the reference picture are treated as one picture and the reference picture may be deleted from the buffer. If the reference picture is the non-key picture, the enhanced layer reference picture may be deleted from the buffer. In this case, the picture is deleted using a first-in-first-out (FIFO) method for first deleting a picture which is first stored in the buffer.

As another embodiment of the present invention, a method for managing a decoded picture buffer using a memory management control operation MMCO (hereinafter, referred to as "MMCO") will be described. When the MMCO is obtained from the current picture in a procedure for decoding the current picture, the decoded picture buffer corresponding to the MMCO is managed. As shown in FIG. 5, when the current picture is the key picture, both the base layer reference picture 52 and the enhanced layer reference picture 54 of the reference picture 50 in the decoded picture buffer are subjected to a memory management control operation 56 (for example, a command for moving the reference picture from a short-term memory to a long-term memory). When the current picture is the non-key picture, the enhanced layer reference picture of the reference picture 58 in the decoded picture buffer is subjected to a memory management control operation 60. The management contents corresponding to the value allocated to the MMCO will now be described in detail with reference to FIG. 7.

Figure 7:
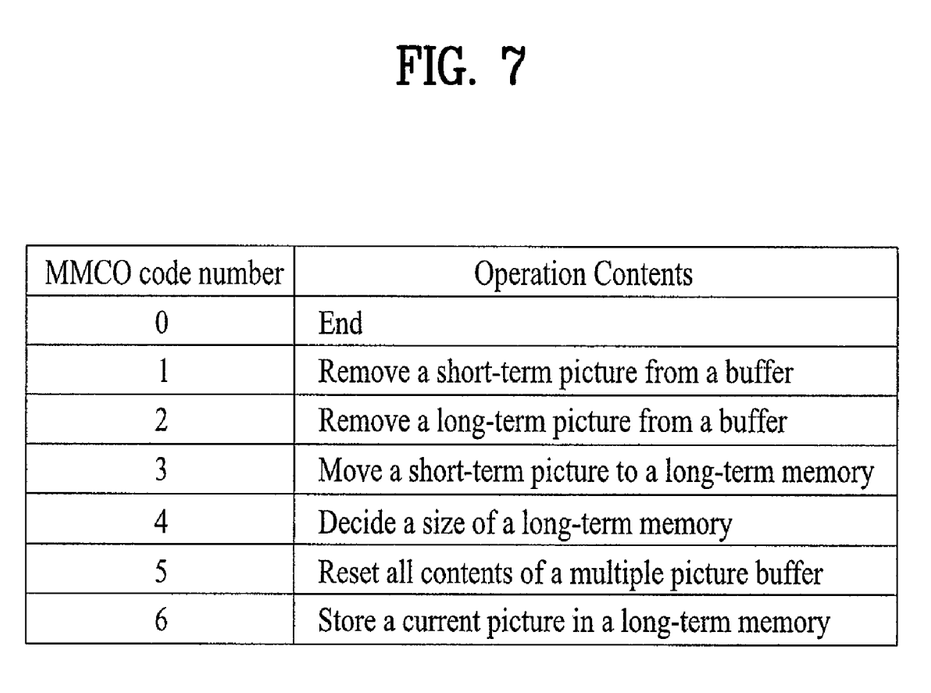
FIG. 7 is a view illustrating management contents of a decoded picture buffer corresponding to code numbers of a memory management control operation (MMCO)

FIG. 7 is a view illustrating the management contents of the decoded picture buffer corresponding to code numbers of the MMCO.

First, when the code number of the MMCO is 0, it is indicated that the memory management is finished. When the code number of the MMCO is 1, it is indicated that a short-term reference picture is marked with a non-reference picture. When the code number of the MMCO is 2, it is indicated that a long-term reference picture is marked with the non-reference picture. When the code number of the MMCO is 3, it is indicated that the short-term reference picture is marked with the long-term reference picture and moved to the long-term memory. When the code number of the MMCO is 4, it is indicated that the size of the long-term memory is decided. When the code number of the MMCO is 5, it is indicated that all the reference pictures are marked with the non-reference picture and all the contents of the buffer are reset. When the code number of the MMCO is 6, it is indicated that the current picture is marked with the long-term reference picture and moved to the long-term memory.

The operation corresponding to the code number of the MMCO is performed with respect to both the base layer reference picture and the enhanced layer reference picture of the reference picture when the current picture is the key picture and is performed with respect to the enhanced layer reference picture of the reference picture when the current picture is the non-key picture. That is, when the same picture identification number is given to the base layer reference picture and the enhanced layer reference picture, the reordering of the reference number, the initialization of the reference picture list, the deletion of the reference picture and the management of the buffer using the MMCO may be performed in the unit of the picture having the same picture identification number. The picture identification number includes the reference index information or the picture number information of the reference picture.

In another embodiment of the present invention, the picture identification information is allocated in the unit of the picture stored in the decoded picture buffer, regardless of whether the reference picture is the key picture or the non-key picture. That is, even when the reference picture is the key picture, different picture identification information is allocated to the base layer reference picture and the enhanced layer reference picture of the reference picture. When the reference picture is the non-key picture, the enhanced layer reference picture of the reference picture is stored in the decoded picture buffer and thus one piece of picture identification information is allocated to the enhanced layer reference picture.

Figure 8:
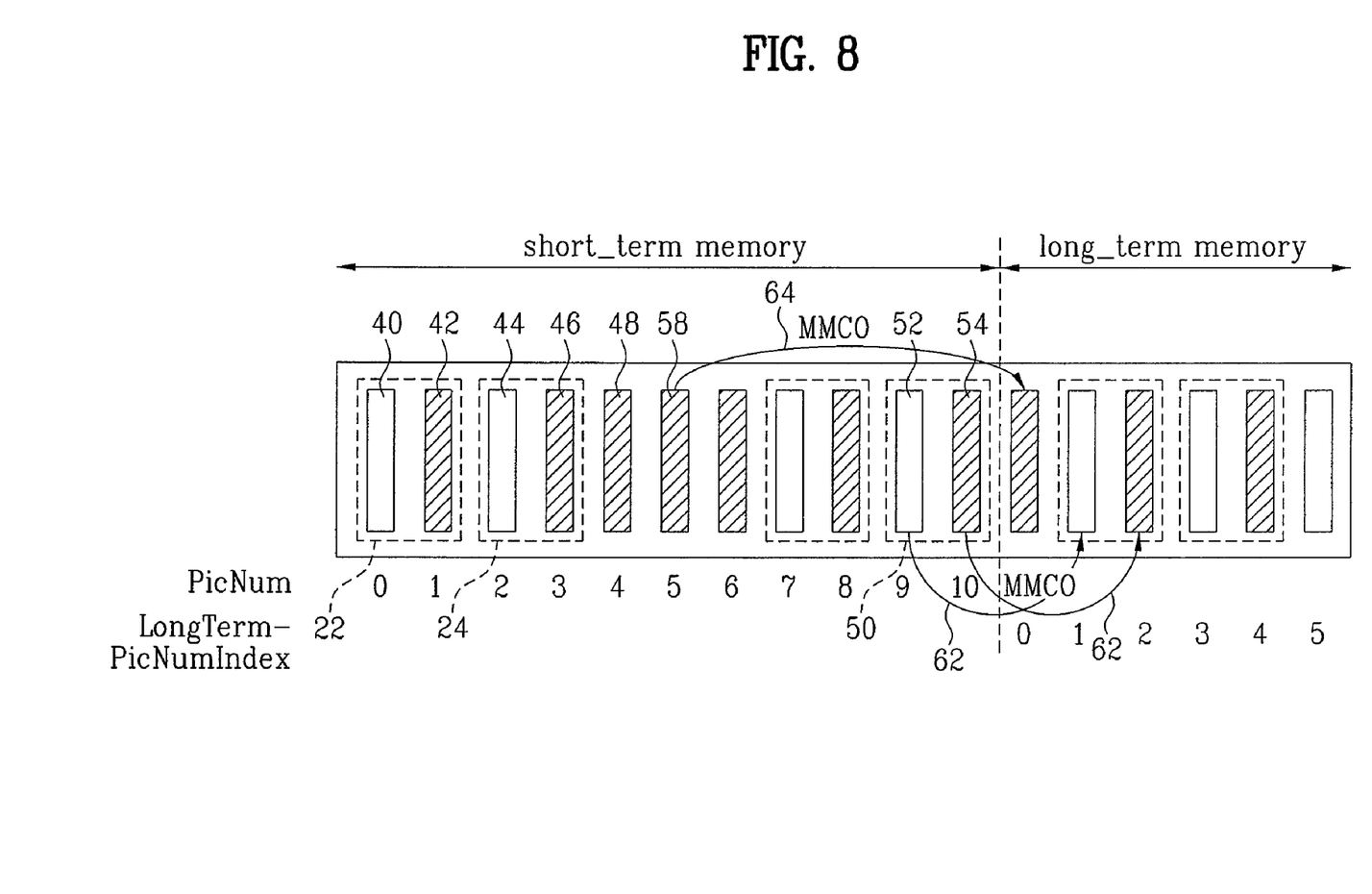
FIG. 8 is a view illustrating a structure of a decoded picture buffer according to another embodiment of the present invention.

FIG. 8 is a view illustrating a structure of a decoded picture buffer according to another embodiment of the present invention.

When the first picture 22 (shown in FIG. 2) which is the key picture as well as the reference picture is decoded and stored in the decoded picture buffer, the picture number 0 is allocated to the base layer reference picture 40 of the first picture 22 and the picture number 1 is allocated to the enhanced layer reference picture 42 of the first picture 22. In the second picture 24 which is the key picture as well as the reference picture similar to the first picture 22, the picture number 2 is allocated to the base layer reference picture 44 of the second picture 24 and the picture number 3 is allocated to the enhanced layer reference picture 46 of the second picture 24. In the third picture 26 which is the non-key picture as well as the reference picture, since the enhanced layer reference picture is stored in the decoded picture buffer, the picture number 4 is allocated to the enhanced layer reference picture 48. Since the fifth pictures 32, 34, 36 and 38 are the non-reference picture, the fifth pictures are not stored in the decoded picture buffer except for the case that the fifth pictures are not displayed immediately after decoding.

As another embodiment of the present invention, in the reordering of the reference numbers, when the current picture is the key picture, only the reference number allocated to the base layer reference picture is reallocated, and, when the reference picture is the non-key picture, only the reference number allocated to the enhanced layer reference picture is reallocated.

As another embodiment of the present invention, in the initialization of the reference picture list and the management of the buffer using the MMCO, if the current picture is the key picture, both the base layer reference picture and the enhanced layer reference picture of the reference picture are subjected to the initialization and the memory management operation using the MMCO even when the reference numbers thereof are different, and, if the current picture is the non-key picture, the enhanced layer reference picture of the reference picture is subjected to the initialization and the memory management operation using the MMCO.

As shown in FIG. 8, for example, an MMCO command 62 that the reference picture 50 is moved from the short-term memory to the long-term memory is obtained from the current picture. When the current picture is the key picture, both the base layer reference picture 52 and the enhanced layer reference picture 54 of the reference picture 50 are moved from the short-term memory to the long-term memory, and, when the current picture is the non-key picture, the enhanced layer reference picture 58 of the reference picture is subjected to an MMCO command 64.

When the reference picture needs to be no longer referred and thus is deleted from the decoded picture buffer using the sliding window method, if the current picture is the key picture, the base layer reference picture and the enhanced layer reference picture of the reference picture are deleted from the buffer even when the reference numbers thereof are different. However, if the current picture is the non-key picture, the enhanced layer reference picture of the reference picture is deleted from the buffer. In this case, the picture is deleted using the first-in-first-out (FIFO) method for first deleting a picture which is first stored in the buffer.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

INDUSTRIAL APPLICABILITY

As described above, according to the present invention, when a key picture is decoded, a base layer reference picture or an enhanced layer reference picture of a reference picture are provided as the reference picture, and, when a non-key picture is decoded, the enhanced layer reference picture of the reference picture is provided as the reference picture. Accordingly, it is possible to minimize a problem caused in a procedure for decoding a video signal due to transmission error. When the video signal is decoded using the above decoding method, it is possible to efficiently decode the video signal using a new method for managing a decoded picture buffer which is optimized by the decoding method.

What the claimed is:

1. A method for decoding a video signal, comprising:
   decoding a quality base layer;
   decoding a quality enhanced layer based on the quality base layer, wherein a quality of a layer is based on a quantization step size;
   marking a picture of the quality base layer and a picture of the quality enhanced layer as a reference picture,
   wherein picture identification information of the picture of the quality base layer is the same as the picture of the quality enhanced layer, and
   wherein in the marking step, the picture of the quality base layer is further marked as another identification information.

2. The method of claim 1, wherein the picture of the quality base layer and the picture of the quality enhanced layer have the lowest temporal resolution, the picture identification information of the picture of the quality base layer being the same as the picture of the quality enhanced layer.

3. The method of claim 1, wherein the picture identification information includes frame number information indicating decoding order, picture number information for a picture identification and reference index information.

4. The method of claim 1, wherein the picture of the quality enhanced layer has a lower quantization step size than the picture of the quality base layer.

* * * * *

UNITED STATES PATENT AND TRADEMARK OFFICE
CERTIFICATE OF CORRECTION

PATENT NO. : 7,869,501 B2  
APPLICATION NO. : 11/992958  
DATED : January 11, 2011  
INVENTOR(S) : Seung Wook Park et al.

Page 1 of 1

It is certified that error appears in the above-identified patent and that said Letters Patent is hereby corrected as shown below:

Please insert on the Title page:

Item (60) Related U.S. Application Data

--(60) Provisional application No. 60/723,474, filed October 5,2005.--

In the Specifications:

Please insert in column 1 under the Title of the Invention:

--Priority Information

This application is a National Phase Application of PCT Patent Application No. PCT/KR2006/003979, filed on October 2, 2006, which claims priority under 35 U.S.C. § 119 to Korean Patent Application No. KR 10-2006-0095950, filed on September 29, 2006, and U.S. Provisional Application No. 60/723,474, filed on October 5, 2005.--

Signed and Sealed this  
Twenty-second Day of March, 2011

David J. Kappos  
*Director of the United States Patent and Trademark Office*

UNITED STATES PATENT AND TRADEMARK OFFICE
CERTIFICATE OF CORRECTION

PATENT NO. : 7,869,501 B2
APPLICATION NO. : 11/992958
DATED : January 11, 2011
INVENTOR(S) : Seung Wook Park et al.

It is certified that error appears in the above-identified patent and that said Letters Patent is hereby corrected as shown below:

In the Claims:

Column 10, Claim 1, Lines 28-40, should read:

1. A method for decoding a video signal by a decoder, comprising:
   decoding, by the decoder, a quality base layer;
   decoding, by the decoder, a quality enhanced layer based on the quality base layer, wherein a quality of a layer is based on a quantization step size;
   marking, by the decoder, a picture of the quality base layer and a picture of the quality enhanced layer as a reference picture,
   wherein picture identification information of the picture of the quality base layer is the same as the picture of the quality enhanced layer, and
   wherein, in the marking step, the picture of the quality base layer is additionally marked with another identification information, the another identification information being used for identifying the picture of the quality base layer in a buffer.

Column 10, Claim 2, Line 41, should read:

2. The method of claim 1, wherein the picture of the quality base layer and the picture of the quality enhanced layer have the lowest temporal resolution.

Column 10, Claim 3, Line 46, should read:

3. The method of claim 1, wherein the picture identification information includes picture number information for a picture.

Signed and Sealed this
Fifth Day of March, 2013

Teresa Stanek Rea
*Acting Director of the United States Patent and Trademark Office*

Column 10, Claim 4, Line 50, should read:

4. The method of claim 1, wherein the picture of the quality enhanced layer has a lower quantization step size than the picture of the quality base layer.